(12) United States Patent
Iannone et al.

(10) Patent No.: US 11,178,472 B2
(45) Date of Patent: Nov. 16, 2021

(54) MONITORING MULTIPLE PASSIVE OPTICAL NETWORKS

(71) Applicant: Nokia Solutions and Networks OY, Espoo (FI)

(72) Inventors: Patrick Iannone, Aberdeen, NJ (US); Michael Straub, Maulbronn (DE); Thomas Pfeiffer, Stuttgart (DE); Joerg Hehmann, Weil der Stadt (DE)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 16/424,678

(22) Filed: May 29, 2019

(65) Prior Publication Data
US 2019/0379952 A1 Dec. 12, 2019

Related U.S. Application Data

(60) Provisional application No. 62/682,277, filed on Jun. 8, 2018.

(51) Int. Cl.
*H04J 14/00* (2006.01)
*H04Q 11/00* (2006.01)
(Continued)

(52) U.S. Cl.
CPC ......... *H04Q 11/0005* (2013.01); *H04B 10/25* (2013.01); *H04B 10/40* (2013.01);
(Continued)

(58) Field of Classification Search
CPC ....... H04Q 11/0005; H04Q 2011/0015; H04Q 2011/0016; H04Q 2011/0058; H04B 10/25; H04B 10/40; H04B 10/691
See application file for complete search history.

(56) References Cited

U.S. PATENT DOCUMENTS

6,301,402 B1 * 10/2001 Bhalla ................ H04Q 11/0005
385/16
8,923,672 B2    12/2014 Bernasconi et al.
(Continued)

OTHER PUBLICATIONS

Iannone, Patrick, et al. "High-split intelligent TWDM PON enabled by distributed Raman amplification." ECOC 2016-Post Deadline Paper; 42nd European Conference on Optical Communication. VDE, 2016. (3 pages).
(Continued)

*Primary Examiner* — Pranesh K Barua
(74) *Attorney, Agent, or Firm* — Mendelsohn Dunleavy, P.C.; Yuri Gruzdkov (57) ABSTRACT

A PON system comprising multiple PONs, each having a respective intelligent splitter monitor (ISM). In addition to having a passive optical splitter therein, an ISM also has several remotely powered active components configured to monitor the presence of uplink light signals on the ports of the splitter and communicate with the central office using out-of-band optical signals. These ISM functionalities enable the network operator, e.g., to automatically map PON connectivity, pairing each port on the splitter with a distinct optical network unit. The PON system further comprises an optical module connected to the multiple PONs through an optical switch in a manner that supports shared access to said module by the corresponding multiple ISMs. In an example embodiment, the optical module comprises an optical transceiver capable of communicating with the ISM transceivers and one or more lasers configured to provide high-intensity light for remotely charging the ISM batteries.

16 Claims, 8 Drawing Sheets

(51) Int. Cl.
  *H04B 10/25* (2013.01)
  *H04B 10/40* (2013.01)
  *H04B 10/69* (2013.01)
  *H04B 10/516* (2013.01)

(52) U.S. Cl.
  CPC ......... *H04B 10/516* (2013.01); *H04B 10/691* (2013.01); *H04Q 2011/0015* (2013.01); *H04Q 2011/0016* (2013.01); *H04Q 2011/0058* (2013.01)

(56) References Cited

U.S. PATENT DOCUMENTS

| | | | |
|---|---|---|---|
| 9,634,761 B2 | 4/2017 | Anthapadmanabhan et al. | |
| 2007/0058973 A1* | 3/2007 | Tanaka | H04B 10/032 398/1 |
| 2007/0077067 A1* | 4/2007 | Wellbrock | H04L 43/0847 398/45 |
| 2007/0154215 A1* | 7/2007 | Zuhdi | H04B 10/071 398/67 |
| 2008/0019693 A1* | 1/2008 | Sorin | H04Q 11/0067 398/71 |
| 2008/0131114 A1* | 6/2008 | Jang | H04B 10/0771 398/13 |
| 2008/0166127 A1* | 7/2008 | Kazawa | H04J 14/025 398/79 |
| 2008/0292314 A1* | 11/2008 | Lu | H04J 14/0247 398/58 |
| 2009/0080880 A1* | 3/2009 | Lee | H04B 10/071 398/14 |
| 2010/0014854 A1* | 1/2010 | Healey | H04B 10/077 398/16 |
| 2010/0098412 A1* | 4/2010 | Boyd | H04J 14/0282 398/25 |
| 2011/0110662 A1* | 5/2011 | Wellbrock | H04Q 11/0067 398/45 |
| 2011/0116798 A1* | 5/2011 | Kai | H04Q 11/0067 398/58 |
| 2011/0255860 A1* | 10/2011 | Lee | H04B 10/0771 398/12 |
| 2012/0121258 A1* | 5/2012 | Li | H04Q 11/0067 398/37 |
| 2012/0288273 A1* | 11/2012 | Pohlmann | H04Q 11/0067 398/9 |
| 2012/0315040 A1* | 12/2012 | Dahlfort | H04J 14/0246 398/58 |
| 2014/0072296 A1* | 3/2014 | Montalvo Garcia | G01M 11/3127 398/16 |
| 2014/0119724 A1* | 5/2014 | Chi | H04B 10/071 398/21 |
| 2014/0212130 A1* | 7/2014 | Urban | G01M 11/3127 398/13 |
| 2014/0341579 A1 | 11/2014 | Effenberger et al. | |
| 2015/0244494 A1 | 8/2015 | Grobe | |
| 2015/0295641 A1* | 10/2015 | Anthapadmanabhan | H04Q 11/0067 398/25 |
| 2016/0006503 A1* | 1/2016 | Chen | H04B 10/0771 398/16 |
| 2016/0020868 A1 | 1/2016 | Lee et al. | |
| 2016/0073180 A1 | 3/2016 | Khotimsky | |
| 2016/0088377 A1 | 3/2016 | Peng et al. | |
| 2016/0112119 A1* | 4/2016 | Vall-Llosera | H04B 10/40 398/21 |
| 2016/0134953 A1 | 5/2016 | Kramer | |
| 2017/0155981 A1* | 6/2017 | Nakagawa | H04Q 11/0005 |
| 2017/0164076 A1* | 6/2017 | Chen | H04J 14/0246 |
| 2018/0069627 A1* | 3/2018 | Park | H04B 10/25754 |
| 2018/0102865 A1* | 4/2018 | Li | H04J 14/0257 |
| 2018/0254847 A1* | 9/2018 | Skubic | H04Q 11/0005 |

OTHER PUBLICATIONS

Hehmann, J., et al. "Remotely powered intelligent splitter monitor for fiber access networks." 2015 European Conference on Optical Communication (ECOC). IEEE, 2015. (3 pages).

Alcatel-Lucent "7360 ISAM FX Shelf", Product Specification, (2 pages).

* cited by examiner

MONITORING MULTIPLE PASSIVE OPTICAL NETWORKS

CROSS-REFERENCE TO RELATED APPLICATIONS

This application claims the benefit of U.S. Provisional Patent Application No. 62/682,277, filed 8 Jun. 2018, and entitled "MONITORING MULTIPLE PASSIVE OPTICAL NETWORKS," which is incorporated herein by reference in its entirety.

BACKGROUND

Field

Various example embodiments relate to optical communication equipment and, more specifically but not exclusively, to passive optical networks.

Description of the Related Art

This section introduces aspects that may help facilitate a better understanding of the disclosure. Accordingly, the statements of this section are to be read in this light and are not to be understood as admissions about what is in the prior art or what is not in the prior art.

A passive optical network (PON) typically has a point-to-multipoint architecture in which passive optical splitters are used to enable a single optical transmitter to broadcast data transmissions to multiple optical receivers. An example PON includes an optical line terminal (OLT) at the service provider's central office (CO) and a plurality of optical network units (ONUs) near or at the individual end users, such as residences, businesses, radio towers, etc. The ONUs are typically connected to the OLT by way of one or more passive optical splitters. Downlink signals are usually broadcast to all ONUs or at least a group of ONUs. Uplink signals are routed using a multiple access protocol, e.g., usually time division multiple access (TDMA). A PON is capable of advantageously reducing the amount of fiber, CO equipment, and active traffic-management equipment, e.g., compared to that required for point-to-point architectures.

SUMMARY OF SOME SPECIFIC EMBODIMENTS

Disclosed herein are various embodiments of a PON system comprising multiple PONs, each having a respective intelligent splitter monitor (ISM). In addition to having a passive optical splitter therein, an ISM may have several remotely powered active components configured to monitor the presence of uplink light signals on the ports of the splitter and communicate with the central office using out-of-band optical signals. These ISM functionalities can be used to enable the network operator, e.g., to automatically map PON connectivity, pairing individual ports on the splitter with distinct ONUs. The PON system may further comprise an optical module connected to the multiple PONs through an optical switch in a manner that supports shared access to said module by the corresponding multiple ISMs. In an example embodiment, the optical module comprises an optical transceiver capable of communicating with the ISM transceivers and one or more lasers configured to provide light for remotely charging the ISM batteries.

In at least some embodiments, the capability for shared access, by the multiple ISMs, to said optical module, e.g., located at the service provider's central office, can advantageously be used, e.g., to reduce the cost and/or complexity of the ISM-enabled multi-PON system.

According to an example embodiment, provided is an apparatus comprising: a plurality of first optical data transceivers, each of the first optical data transceivers being connected to transmit and receive data-modulated light; an optical monitor; and an optical cross-connect configured to connect each of the first optical data transceivers to a corresponding optical fiber; and wherein the optical monitor is optically connected to the optical cross-connect, and the optical cross-connect is switchable to optically connect the optical monitor to selected individual ones of the optical fibers such that the optical monitor can transmit light to and receive light from the selected individual ones of the optical fibers.

According to another example embodiment, provided is an apparatus comprising: a passive optical router connectable to route light between a first optical fiber and a plurality of second optical fibers; an optical receiver configured to receive a first modulated optical signal applied to the apparatus by the first optical fiber, said first modulated optical signal having a first wavelength; a photovoltaic cell configured to charge a capacitor in response to light applied to the apparatus by the first optical fiber, said applied light having a second wavelength that is different from the first wavelength; and an electronic controller configured to control electrical-power distribution from the capacitor to power the optical receiver and the electronic controller.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Some embodiments may benefit from the use of at least some features disclosed in U.S. Pat. No. 9,634,761 and U.S.

Patent Application Publication No. 2012/0288273, both of which are incorporated herein by reference in their entirety.

In a wavelength-division-multiplexing PON (WDM-PON), multiple carrier wavelengths are used for traffic in the same direction, e.g., downlink or uplink, over the same fiber network. An example WDM-PON architecture is disclosed, e.g., in U.S. Pat. No. 8,923,672, which is incorporated herein by reference in its entirety.

The following acronyms/abbreviations are used in the description of various embodiments and/or in the accompanying drawings:
CO Central Office;
FMDF Fiber Main Distribution Frame;
ISM Intelligent Splitter Monitor;
LGX Light Guide Cross-connect;
μC MicroController;
ODN Optical Distribution Network;
OLT Optical Line Terminal;
OMM ODN Monitoring Module;
ONT Optical Network Termination (can be synonymous with ONU);
ONU Optical Network Unit (can be synonymous with ONT);
OXC Optical Cross-Connect;
PD Photo Detector;
PLC Planar Lightguide Circuit;
PON Passive Optical Network;
Rx Receiver;
SCap Capacitor and/or Battery;
TDM Time-Division Multiplexing;
TDMA Time-Division Multiple Access;
Tx Transmitter;
WDM Wavelength Division Multiplexing; and
WSS Wavelength Selective Switch.

Figure 1:
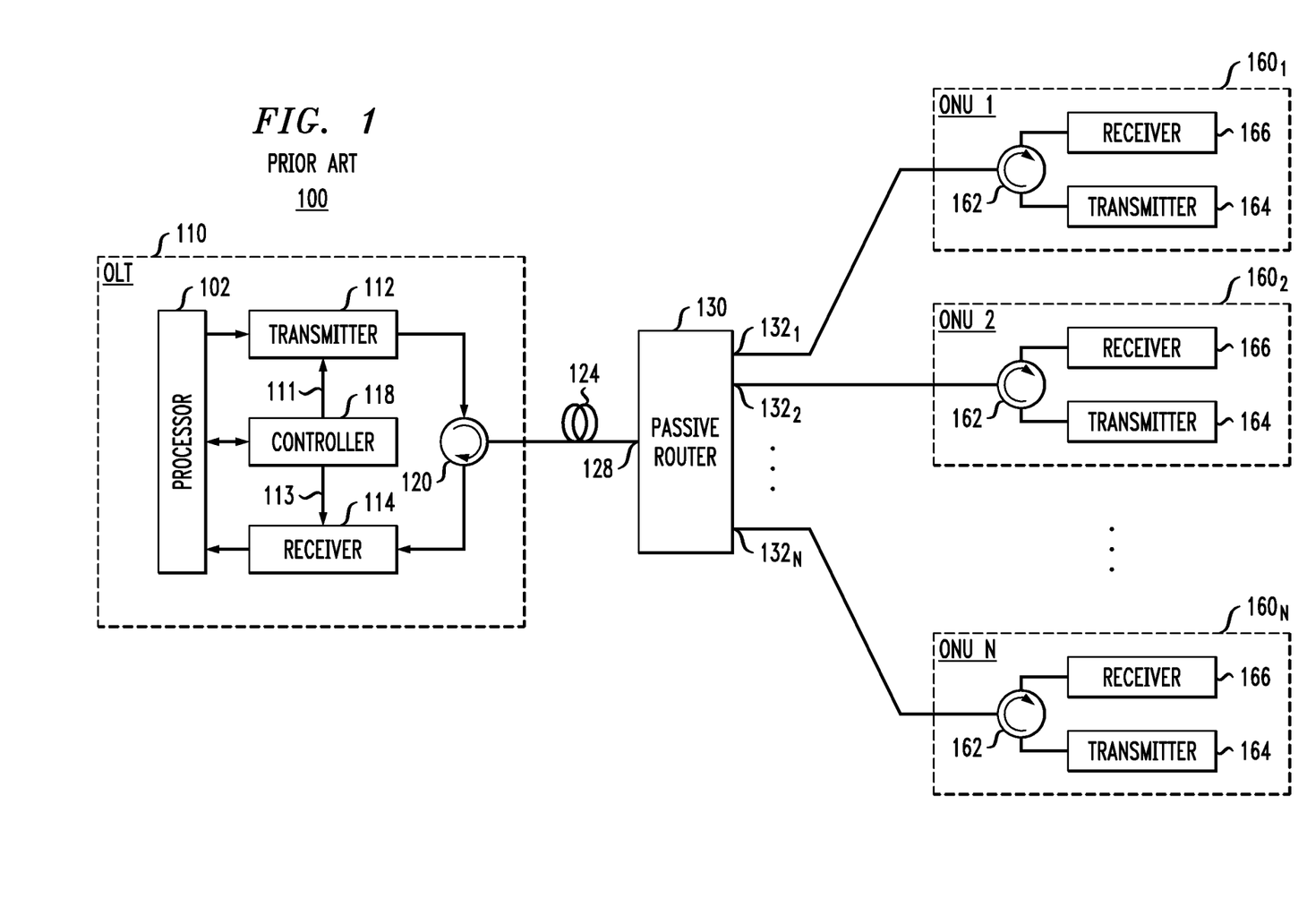
FIG. 1 shows a block diagram of a conventional PON system.

FIG. 1 shows a block diagram of a conventional PON system 100. System 100 has an OLT 110 configured to communicate with ONUs $160_1$-$160_N$. The number N can be, e.g., in the range from 2 to 256. In some cases, ONUs $160_1$-$160_N$ can be configured to use (nominally) the same carrier wavelength for uplink transmissions. In some other cases, ONUs $160_1$-$160_N$ can be configured to use different respective carrier wavelengths for uplink transmissions.

OLT 110 comprises an optical transmitter 112 and an optical receiver 114, both coupled, by way of an optical circulator 120 or other suitable directional optical coupler (e.g., an optical diplexer or triplexer based on thin-film technologies), to an optical fiber 124. Operation, functions, and configurations of transmitter 112 and receiver 114 can be managed and controlled using control signals 111 and 113 generated by an electronic controller 118. A processor 102 that is coupled to transmitter 112, receiver 114, and controller 118 can be used for signal and data processing and, optionally, for supporting some functions of the controller. In an example embodiment, optical fiber 124 can have a length between about 1 km and about 40 km.

Transmitter 112 is configured to broadcast downlink signals to ONUs $160_1$-$160_N$ using one or more downlink carrier wavelengths, with a suitable time-division multiplexing (TDM) protocol being used to transmit signals intended for different ONUs. Receiver 114 is configured to receive uplink signals from ONUs $160_1$-$160_N$ transmitted using one or more uplink carrier wavelengths. A suitable TDMA protocol executed using controller 118 is typically used to prevent collisions, at receiver 114, between the uplink signals generated by different ONUs 160.

Optical fiber 124 connects OLT 110 to a passive router 130. Depending on the embodiment, router 130 can be implemented using: (i) a (1×N) passive optical splitter/combiner; (ii) a passive wavelength router (e.g., an arrayed waveguide grating, AWG); or (iii) any suitable combination of wavelength-insensitive and/or wavelength-sensitive passive optical elements. A typical router 130 has (N+1) optical ports, including a single port 128 at its first or uplink side and a set of N ports $132_1$-$132_N$ at its second or downlink side. Herein, the term "side" is used in an abstract sense to indicate "uplink" or "downlink" directions rather than in a physical-orientation sense. Port 128 is internally optically connected to each of ports $132_1$-$132_N$. Port 128 is externally optically connected to optical fiber 124 as indicated in FIG. 1. Ports $132_1$-$132_N$ are externally optically connected to ONUs $160_1$-$160_N$, respectively, e.g., via optical fibers, as further indicated in FIG. 1, or via more complex, passive optical-fiber networks. Example devices that can be used to implement router 130 are disclosed, e.g., in the above-cited U.S. Pat. No. 8,923,672.

Typically, each of ONUs $160_1$-$160_N$ includes a respective optical circulator 162 or other suitable directional optical coupler, a respective optical transmitter 164, and a respective optical receiver 166. Optical circulator 162 is configured to (i) direct downlink signals received from router 130 to optical receiver 166 and (ii) direct uplink signals from optical transmitter 164 to router 130.

In an example commercial application, system 100 can be configured to operate such that all downlink signals are spectrally located in a spectral band near 1.55 μm, and all uplink signals are spectrally located in a spectral band near 1.3 μm, or vice versa. In such cases, all or some of optical circulators 120 and 162 may be replaced by respective optical band-pass or dichroic optical filters.

While FIG. 1 illustrates a PON with a single passive optical router 130, more-complex PON architectures are also possible, such as PON architectures having multiple passive optical routers and tree-and-branch sub-topologies.

Figure 2:
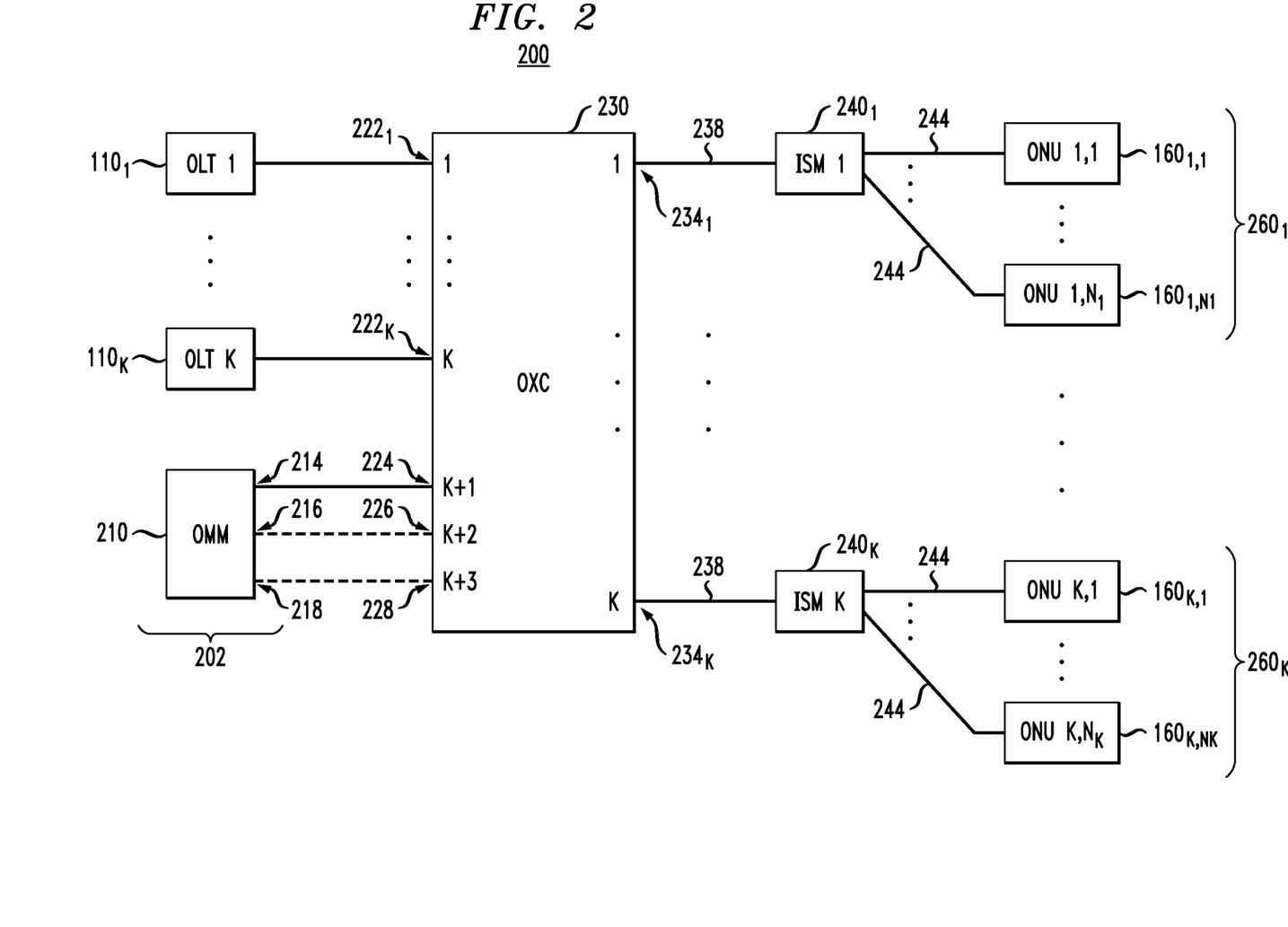
FIG. 2 shows a block diagram of a PON system according to an embodiment.

FIG. 2 shows a block diagram of a PON system 200 according to an embodiment. System 200 comprises K OLTs 110, which are labeled in FIG. 2 using the reference numerals $110_1$-$110_K$, where K is a positive integer greater than one. In an example embodiment, the number K can be between 2 and about 300. System 200 further comprises ONU sets $260_1$-$260_K$, each ONU set $260_k$ having $N_k$ ONUs 160, where k=1, ..., K. In the embodiment shown in FIG. 2, the ONU set $260_1$ has $N_1$ ONUs 160, which are labeled $160_{1,1}$, ..., $160_{1,N1}$, respectively. The ONU set $260_K$ has $N_K$ ONUs 160, which are labeled $160_{K,1}$, ..., $160_{K,NK}$, respectively.

In an example embodiment, each of the numbers $N_k$ can be in the same range as the number N described above in reference to FIG. 1. Depending on the specific embodiment, any two numbers $N_k$ corresponding to different values of the index k may be the same or different. For example, in some embodiments, the numbers $N_1$ and $N_K$ may be the same. In some other embodiments, the numbers $N_1$ and $N_K$ may be different.

All ONUs 160 from an ONU set $260_k$ are connected by respective distribution optical fibers 244 to downlink ports of a same intelligent splitter monitor (ISM) $240_k$. For example, ONUs $160_{1,1}$, ..., $160_{1,N1}$ of the ONU set $260_1$ are all connected to ISM $240_1$. Similarly, ONUs $160_{K,1}$, ..., $160_{K,NK}$ of the ONU set $260_K$ are all connected to ISM $240_K$. Uplink ports of ISMs $240_1$-$240_K$ are connected by respective feeder optical fibers 238 to optical ports $234_1$-$234_K$, respectively, of an optical cross-connect (OXC) 230.

An ISM $240_k$ is substantially a passive optical splitter, but with some additional, remotely powered active components that enable: (i) monitoring of the presence of uplink light signals; and (ii) communication with a central office (CO) 202 using out-of-band optical signals. This functionality, e.g., allows network operators to automatically map PON connectivity, pairing each downlink port of ISM $240_k$ with a distinct ONU 160 of the ONU set $260_k$. Example embodiments of an ISM 240 are described in more detail below in reference to FIGS. 4 and 6. As indicated in FIG. 2, CO 202 includes OLTs $110_1$-$110_K$ and an ODN monitoring module (OMM) 210, where ODN stands for optical distribution network.

In an example embodiment, OMM 210 has a single optical input/output (I/O) port 214 that is connected to an optical port 224 of OXC 230. In an alternative embodiment, in addition to port 214, OMM 210 also has an optional optical output port 216 that is connected to an optical port 226 of OXC 230. In another alternative embodiment, in addition to ports 214 and 216, OMM 210 has another optical output port (labeled 218) that is connected to an optional optical port 228 of OXC 230.

OLTs $110_1$-$110_K$ are connected to optical ports $222_1$-$222_K$, respectively, of OXC 230.

OXC 230 is configured to provide the following connectivity.

Each of ports $222_1$-$222_K$ is connected to a respective one of ports $234_1$-$234_K$. The indices (subscripts) of the two connected ports 222 and 234 do not need to be the same, although they can be in some configurations of OXC 230. For example, port $222_1$ may be connected to port $234_K$. Port $222_K$ may be connected to some other port $234_k$ (not explicitly shown in FIG. 2), etc. The pairings of different ports 222 and 234 are usually established at the initial-setup or system-deployment stage and typically remain fixed (static) during regular operation, e.g., until system 200 needs to be reconfigured. These fixed connections between ports 222 and 234, in effect, create K different PONs, each resembling PON 100 of FIG. 1.

Port 224 can be connected to any one of ports $234_1$-$234_K$. This connection is typically dynamic and can be changed during regular operation to support shared access of ISMs $240_1$-$240_K$ to OMM 210. For example, the connection of port 224 can be switched based on any suitable TDMA schedule or protocol.

If present, port 226 can be connected to any one of ports $234_1$-$234_K$, as long as the connected port is not the same port 234 to which port 224 is connected at that time. This connection is also typically dynamic and can be changed during regular operation.

If present, port 228 can be connected to any one of ports $234_1$-$234_K$, as long as the connected port is not the same port 234 to which either of ports 224 and 226 is connected. This connection is also typically dynamic and can be changed during regular operation.

Depending on the embodiment, OXC 230 can be a (K+1)×K cross-connect, a (K+2)×K cross-connect, or a (K+3)×K cross-connect. In one possible embodiment, OXC 230 can be implemented using a wavelength-selective switch (WSS) of a suitable size. Other example embodiments of OXC 230 are described below in reference to FIGS. 7-9.

Figure 3:
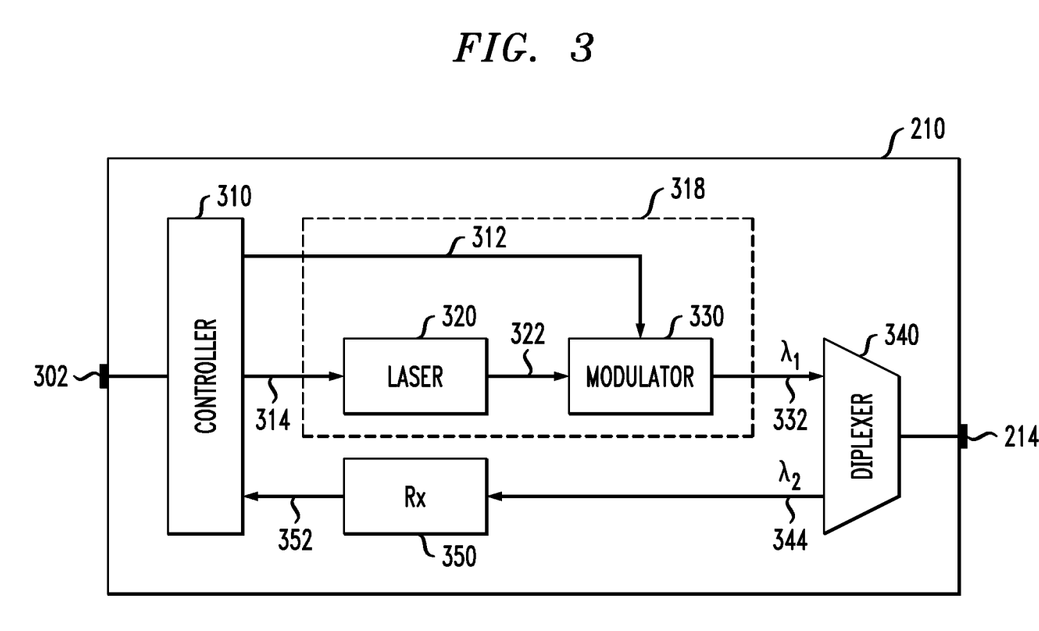
FIG. 3 shows a block diagram of an optical monitoring module that can be used in the PON system of FIG. 2 according to an embodiment.

FIG. 3 shows a block diagram of an OMM 210 that can be used in system 200 (FIG. 2) according to an embodiment. In this particular embodiment of OMM 210, output ports 216 and 218 are absent.

As shown in FIG. 3, OMM 210 comprises a diplexer 340 connected to optical I/O port 214 and configured to: (i) route downlink signals from an optical transmitter 318 to optical I/O port 214; and (ii) route uplink signals from optical I/O port 214 to an optical receiver 350. Optical transmitter 318 is configured to generate uplink signals of carrier wavelength $\lambda_1$. Optical receiver 350 is configured to receive downlink signals of carrier wavelength $\lambda_2$. Both of carrier wavelengths $\lambda_1$ and $\lambda_2$ are different from the carrier wavelength(s) used by the OLTs $110_1$-$110_K$ for transmissions to and from the various ONUs 160 (see FIG. 2). For example, wavelengths $\lambda_1$ and $\lambda_2$ can be 1430 nm and 1450 nm, respectively, whereas the uplink and downlink carrier wavelengths used by the OLTs $110_1$-$110_K$ can be about 1310 nm and about 1490 nm, respectively.

In an example embodiment, optical transmitter 318 comprises a laser 320 and an optical modulator 330. Laser 320 is a relatively powerful laser that generates continuous wave (CW) light 322 at wavelength $\lambda_1$. Optical modulator 330 then modulates light 322, in response to an electrical signal 312 received from an OMM controller 310. A resulting modulated optical signal 332 is applied by diplexer 340 to optical I/O port 214 for transmission to port 224 of OXC 230. In an example embodiment, modulated optical signal 332 serves a dual purpose of: (i) carrying control messages to the corresponding connected ISM $240_k$, and (ii) providing a power source for the active components of that same ISM $240_k$, e.g., as explained in reference to FIG. 4. In some embodiments, OMM controller 310 may also generate an optional control signal 314 that can be used to set and/or change some operating parameters of laser 320, such as the optical power and/or wavelength of light 322.

In some other embodiments (not explicitly shown), optical transmitter 318 may directly modulate laser 320 rather than having the external modulator 330 to produce the data-modulated optical signal to transmit to diplexer 340. In such embodiments, modulator 330 may be absent.

Optical receiver 350 operates to process a modulated optical signal 344 having carrier wavelength $\lambda_2$ and received from I/O port 214 by way of diplexer 340. In an example embodiment, optical signal 344 carries messages generated by the corresponding connected ISM $240_k$, e.g., to transmit relevant telemetry information regarding the corresponding ONUs. An electrical signal 352 generated by optical receiver 350 in response to optical signal 344 is applied to OMM controller 310 to convey said messages thereto.

In an example embodiment, OMM controller 310 operates to: (i) process the telemetry information received from different ISMs $240_k$; and (ii) based on said processing, generate further control messages directed through an electrical port 302 to a system controller (not explicitly shown in FIG. 2) and/or the relevant ones of OLTs $110_1$-$110_K$.

In some embodiments, OMM 210 can be implemented as a line card housed in the same equipment cabinet as at least some of OLTs $110_1$-$110_K$.

Figure 4:
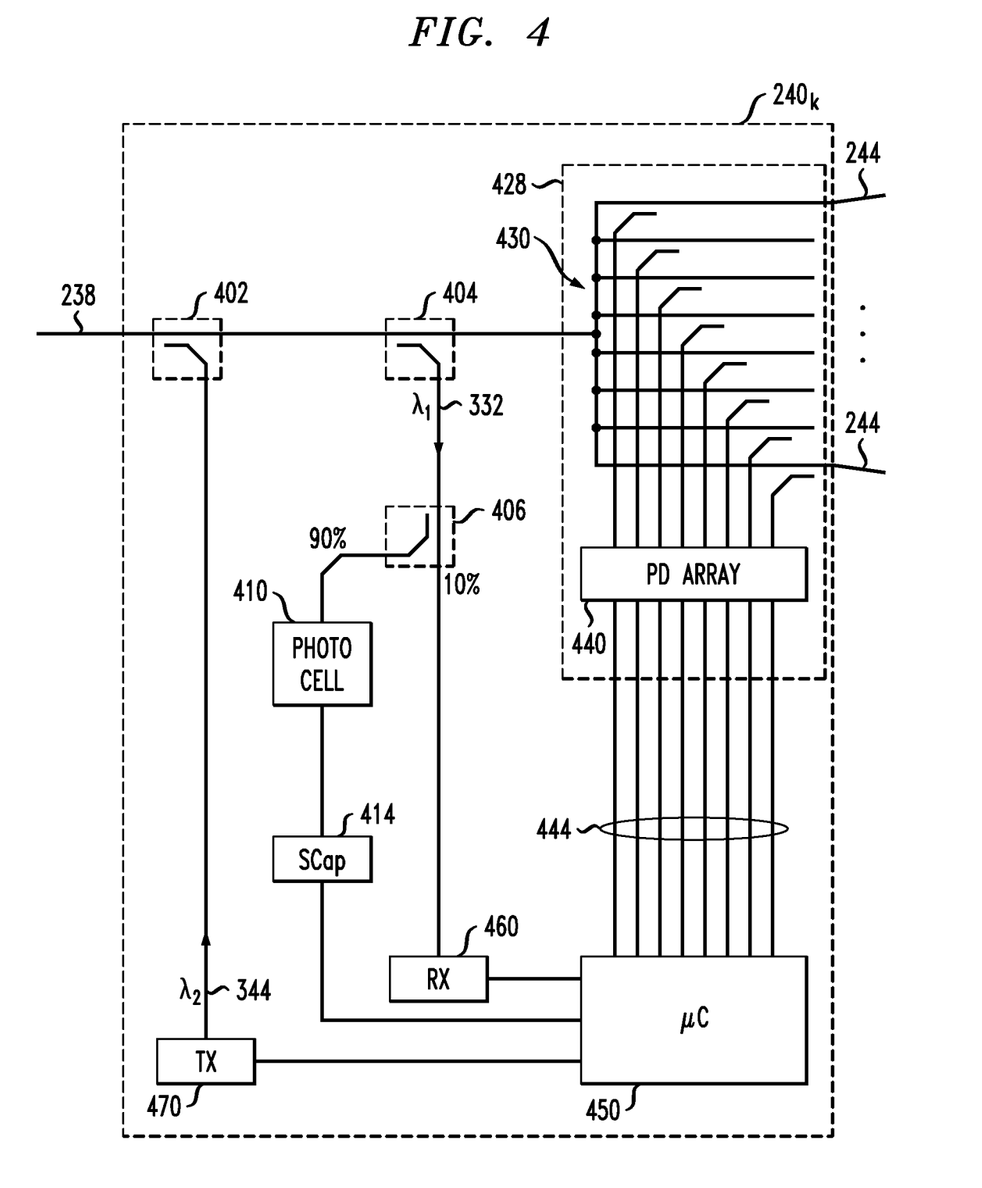
FIG. 4 shows a block diagram of an intelligent splitter monitor that can be used in the PON system of FIG. 2 according to an embodiment.

FIG. 4 shows a block diagram of an ISM $240_k$ that can be used in system 200 (FIG. 2) according to an embodiment. Also shown in FIG. 4 are the corresponding feeder optical fiber 238 and distribution optical fibers 244. Fiber 238 optically connects ISM $240_k$ to OXC 230 (also see FIG. 2). Fibers 244 optically connect ISM $240_k$ to ONUs $160_{k,1}, \ldots, 160_{k,Nk}$ (also see FIG. 2).

ISM $240_k$ comprises a passive optical router 430, e.g., a conventional passive optical router or splitter, connected between feeder optical fiber 238 and distribution optical fibers 244 as indicated in FIG. 4. For downlink signals, router 430 acts as a $1 \times N_k$ optical splitter that causes the optical power of the downlink signal received through feeder optical fiber 238 from the corresponding OLT 110 (also see FIG. 2) to be distributed between the $N_k$ distribution optical fibers 244, e.g., distributed with approximately equal or unequal power. For an uplink signal received through a given one of the distribution optical fibers 244, router 430 operates to: (i) direct a small portion (e.g., <5% or ≤10%) of that signal, through a respective optical tap, to a respective photodetector (PD) of a PD array 440; and (ii) direct the remaining portion (minus the coupling loss) of that signal to feeder optical fiber 238. Each photodetector of PD array 440 converts the received light (if any) into a respective electrical signal, which is then directed, through a respective electrical line of bus 444, to a controller 450, e.g., a microcontroller (μm).

In some embodiments, passive optical router 430 and/or PD array 440 can be implemented as parts of a corresponding planar lightguide circuit (PLC), e.g., PLC 428.

ISM $240_k$ further comprises an optical transmitter 470 and an optical receiver (Rx) 460. Optical transmitter (Tx) 470 is configured to generate optical signal 344 (also see FIG. 3) carrying messages generated by microcontroller 450, e.g., based on the light measurements performed by PD array 440. As already indicated above, optical signal 344 has the carrier wavelength $\lambda_2$. A conventional add-wavelength multiplexer 402 operates to couple optical signal 344 generated by transmitter 470 into feeder optical fiber 238, as indicated in FIG. 4, for transmission to OMM 210 (also see FIGS. 2, 3).

A conventional drop-wavelength demultiplexer 404 operates to drop optical signal 332 from feeder optical fiber 238, as indicated in FIG. 4, and direct the dropped optical signal toward optical receiver 460. As already indicated above, optical signal 332 is generated by OMM 210 and has the carrier wavelength $\lambda_1$ (also see FIGS. 2, 3). An optical power splitter 406 then operates to split the dropped optical signal 332 into two portions, with the first portion being applied to optical receiver 460, and the second portion being applied to a photovoltaic cell 410. In an example embodiment, splitter 406 can be a 10:90 power splitter. In other embodiments, other suitable splitting ratios can alternatively be used as well. As already indicated above, the optical output power generated by laser 320 (FIG. 3) is sufficiently high to enable optical receiver 460 to receive enough light for its proper operation, despite the relatively high light attenuation imposed by splitter 406. In response to the received portion of optical signal 332, optical receiver 460 generates a corresponding electrical signal that delivers to microcontroller 450 the corresponding control messages from OMM 210.

In response to the other portion of optical signal 332, photovoltaic cell 410 generates electrical current that charges a capacitor 414, e.g., a battery or a supercapacitor (SCap). Controller 450 operates to manage electrical-power distribution from capacitor or battery 414 to various active components of ISM $240_k$. In an example embodiment, said active components include a biasing network for the PD array 440, optical receiver 460, optical transmitter 470. Controller 450 itself is also powered by capacitor or battery 414.

At least some embodiments of ISM $240_k$ can benefit from the use of some features described in (i) the above-cited U.S. Patent Application Publication No. 2012/0288273 and (ii) "Remotely Powered Intelligent Splitter Monitor for Fiber Access Networks," J. Hehmann, M. Straub, L. Jentsch, M. Earnshaw, P. Anthapadmanabhan, and Th. Pfeiffer, in Proc. ECOC, Tu. 1.5.4., Valencia, 2015, which is incorporated herein by reference in its entirety.

Figure 5:
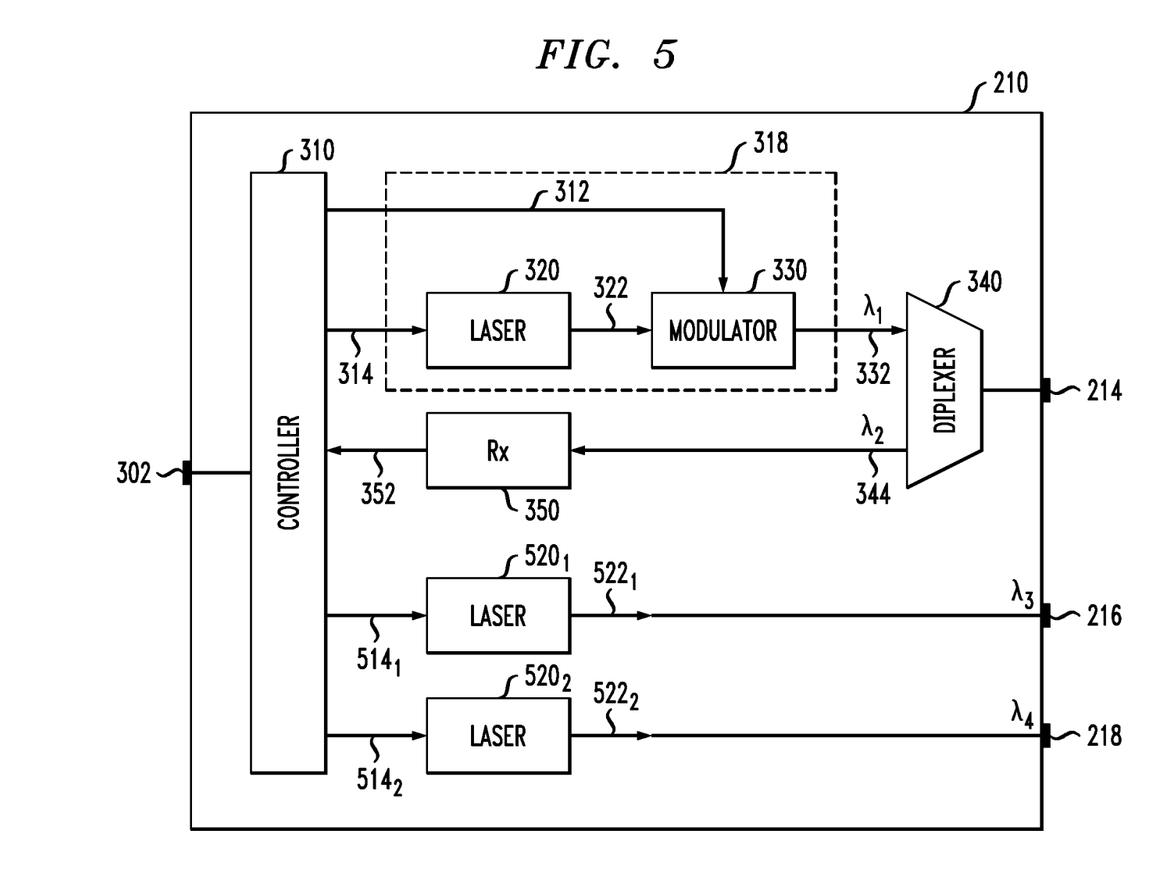
FIG. 5 shows a block diagram of an optical monitoring module that can be used in the PON system of FIG. 2 according to an alternative embodiment.

FIG. 5 shows a block diagram of an OMM 210 that can be used in system 200 (FIG. 2) according to an alternative embodiment. In this particular embodiment, OMM 210 has I/O port 214 and output ports 216 and 218.

In the embodiment of FIG. 5, two dedicated remote-powering lasers are incorporated into OMM 210 of FIG. 3. A remote-powering laser 520 is configured to generate CW light $522_1$ at wavelength $\lambda_3$ and apply said light to output port 216 (also see FIG. 2). A remote-powering laser $520_2$ is configured to generate CW light $522_2$ at wavelength $\lambda_4$ and apply said light to output port 218 (also see FIG. 2). Similar to wavelengths $\lambda_1$ and $\lambda_2$, wavelengths $\lambda_3$ and $\lambda_4$ are out-of-band wavelengths that are different from the carrier wavelength(s) used by the OLTs $110_1$-$110_K$ for transmissions to and from the various ONUs 160. OMM controller 310 may be modified to additionally generate optional control signals $514_1$ and $514_2$ that can be used to set and/or change some operating parameters of lasers $520_1$ and $520_2$, respectively. In an example embodiment, lasers $520_1$ and $520_2$ are, e.g., relatively powerful lasers whose optical output power is sufficient for remotely charging the capacitors and/or batteries 414 of different ISMs $240_k$ (also see FIG. 6).

On the other hand, output-power requirements to laser 320 can be significantly relaxed compared to those applied in the embodiment of FIG. 3 because, in the embodiment of FIG. 5, laser 320 is no longer used as a remote-powering laser.

In some embodiments, one of lasers $520_1$ and $520_2$ may be absent.

In some embodiments, OMM 210 may be configured to apply non-data-bearing modulation to CW light $522_1$ and/or $522_2$ to reduce and/or avoid certain detrimental nonlinear effects in system 200.

Figure 6:
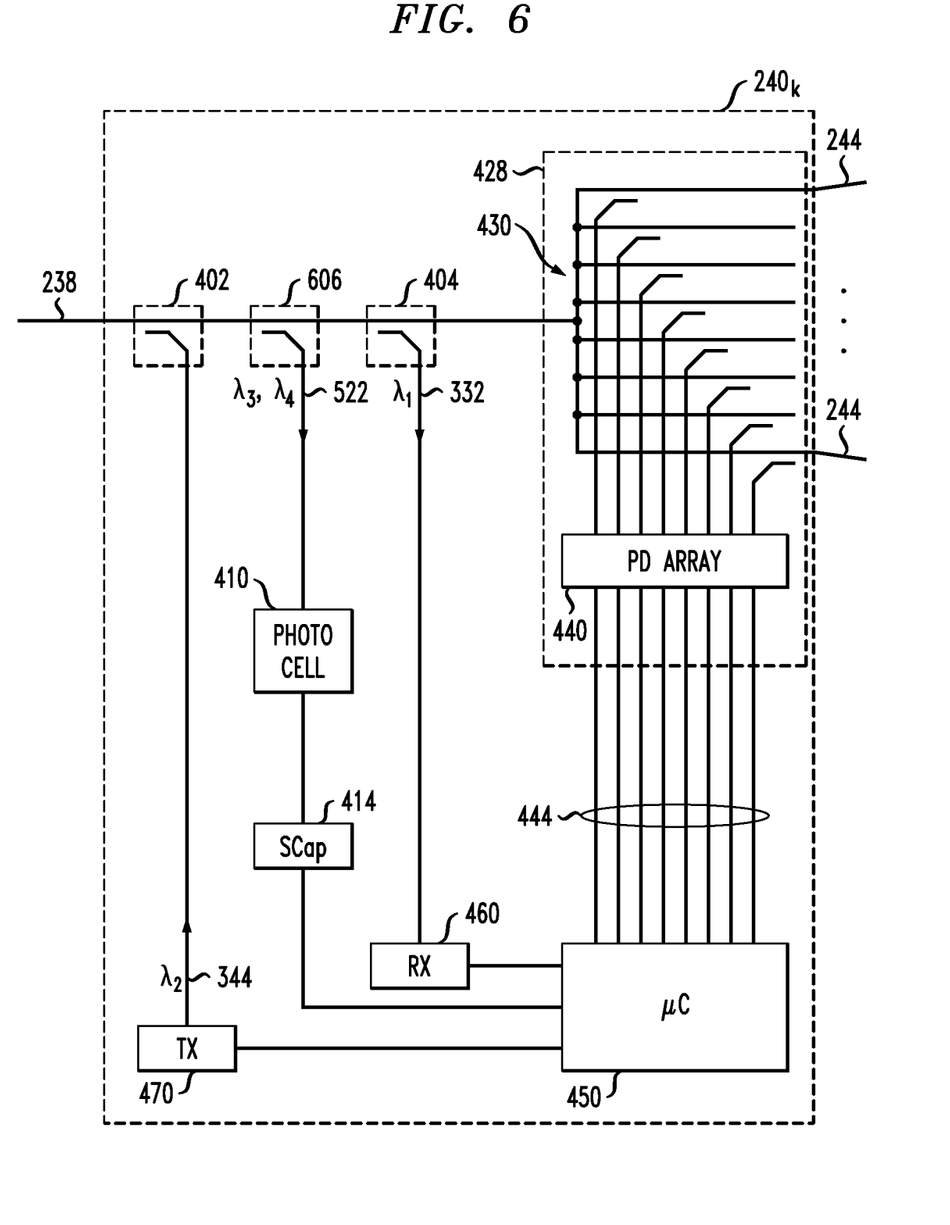
FIG. 6 shows a block diagram of an intelligent splitter monitor that can be used in the PON system of FIG. 2 according to an alternative embodiment.

FIG. 6 shows a block diagram of an ISM $240_k$ that can be used in system 200 (FIG. 2) according to an alternative embodiment. This particular embodiment of ISM $240_k$ is compatible with the embodiment of OMM 210 shown in FIG. 5.

In the embodiment of FIG. 6, optical splitter 406 is absent (also see FIG. 4). Instead, a drop-wavelength demultiplexer 606 is connected to feeder optical fiber 238, as indicated in FIG. 6. In operation, drop-wavelength demultiplexer 606 can drop either of optical signals $522_1$ and $522_2$ from feeder optical fiber 238 and direct the dropped optical signal to photovoltaic cell 410. In response to the received optical signal 522, photovoltaic cell 410 generates electrical current that charges battery 414.

In some other alternative embodiments, drop-wavelength demultiplexers 404 and 606 and add-wavelength multiplexer 402 can be replaced by any suitable optical add-drop multiplexer or other wavelength-selective router capable of the same wavelength routing as that indicated in FIG. 6.

Figure 7:
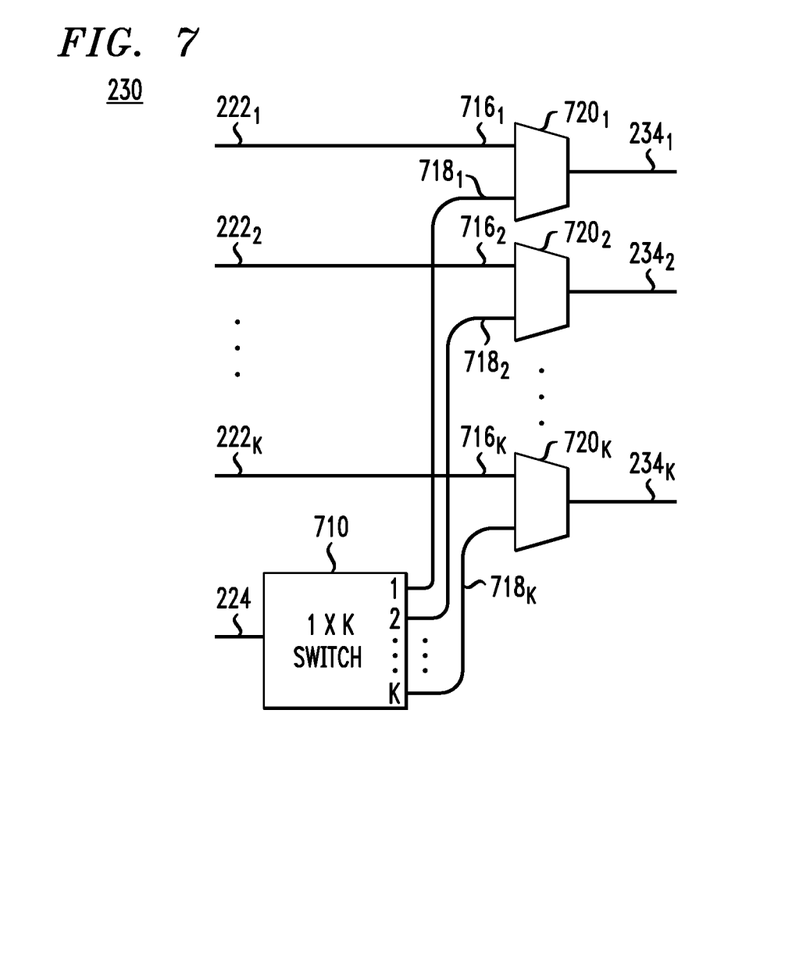
FIG. 7 shows a block diagram of an optical cross-connect that can be used in the PON system of FIG. 2 according to an embodiment.

FIG. 7 shows a block diagram of OXC 230 (FIG. 2) according to an embodiment. In the shown embodiment, OXC 230 is a (K+1)×K OXC that comprises a 1×K optical switch 710 and K wavelength multiplexers $720_1$-$720_K$.

In an example embodiment, optical switch 710 can be a colorless switch that can connect optical port 224 to any one of optical ports 1, . . . , K thereof. A wavelength multiplexer $720_k$ has optical ports $716_k$, $718_k$, and $234_k$. Optical port $716_k$ is directly connected to optical port $222_k$. Optical port $718_k$ is connected, e.g., to the k-th port of the set of optical ports 1, . . . , K of optical switch 710.

In an example embodiment, wavelength multiplexer $720_k$ can be configured to perform the following wavelength routing. Any in-band wavelength used in system 200 is routed between optical ports $716_k$ and $234_k$. Any out-of-band wavelength used in system 200 is routed between optical ports $718_k$ and $234_k$.

As used herein, the term "in-band" refers to the wavelengths used for communications between the pertinent OLTs 110 and ONUs 160 of system 200 (see FIG. 2). The term "out-of-band" refers to the wavelengths used for: (i) communications between OMM 210 and ISMs 240; and/or (ii) remote optical powering of ISMs 240. For example, the above-mentioned wavelengths $\lambda_1$-$\lambda_4$ (also see FIGS. 3-6) are out-of-band wavelengths.

Figure 8A:
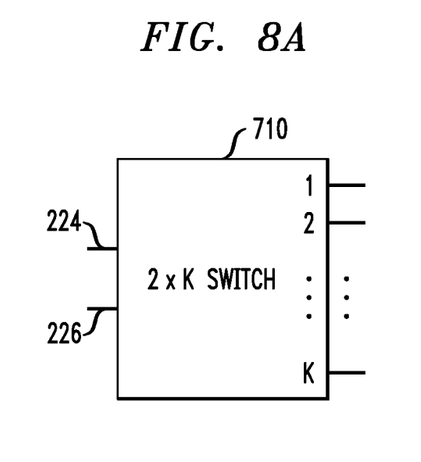
FIGS. 8A-8B illustrate alternative embodiments of an optical switch that can be used in the optical cross-connect of FIG. 7.
Figure 8B:
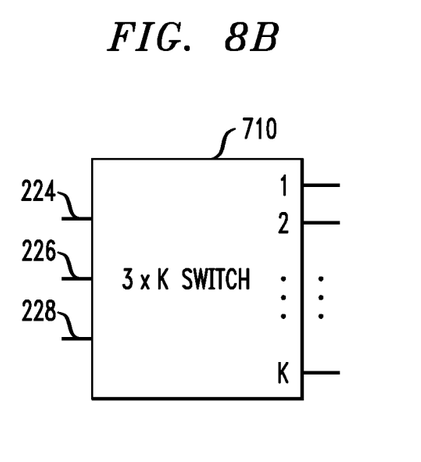

FIGS. 8A-8B illustrate alternative embodiments of optical switch 710 of FIG. 7.

In the embodiment of FIG. 8A, optical switch 710 is a 2×K optical switch. In an example embodiment, said optical switch 710 can be a colorless switch that can connect optical port 224 to any one of optical ports 1, ..., K thereof, and can also connect optical port 226 to any one of the optical ports 1, ..., K that is different from the optical port to which optical port 224 is connected.

In the embodiment of FIG. 8B, optical switch 710 is a 3×K optical switch. In an example embodiment, said optical switch 710 can be a colorless switch that can connect optical port 224 to any one of optical ports 1, ..., K thereof; can also connect optical port 226 to any one of the optical ports 1, ..., K that is different from the optical port to which optical port 224 is connected; and can also connect optical port 228 to any one of the optical ports 1, ..., K that is different from the optical ports to which optical ports 224 and 226 are connected.

In some embodiments, optical switch 710 of FIG. 8A or 8B can be a wavelength-selective switch. In such embodiments, any of optical ports 1, ..., K can be connected to more than one of optical ports 224, 226, and 228 (if present).

Figure 9:
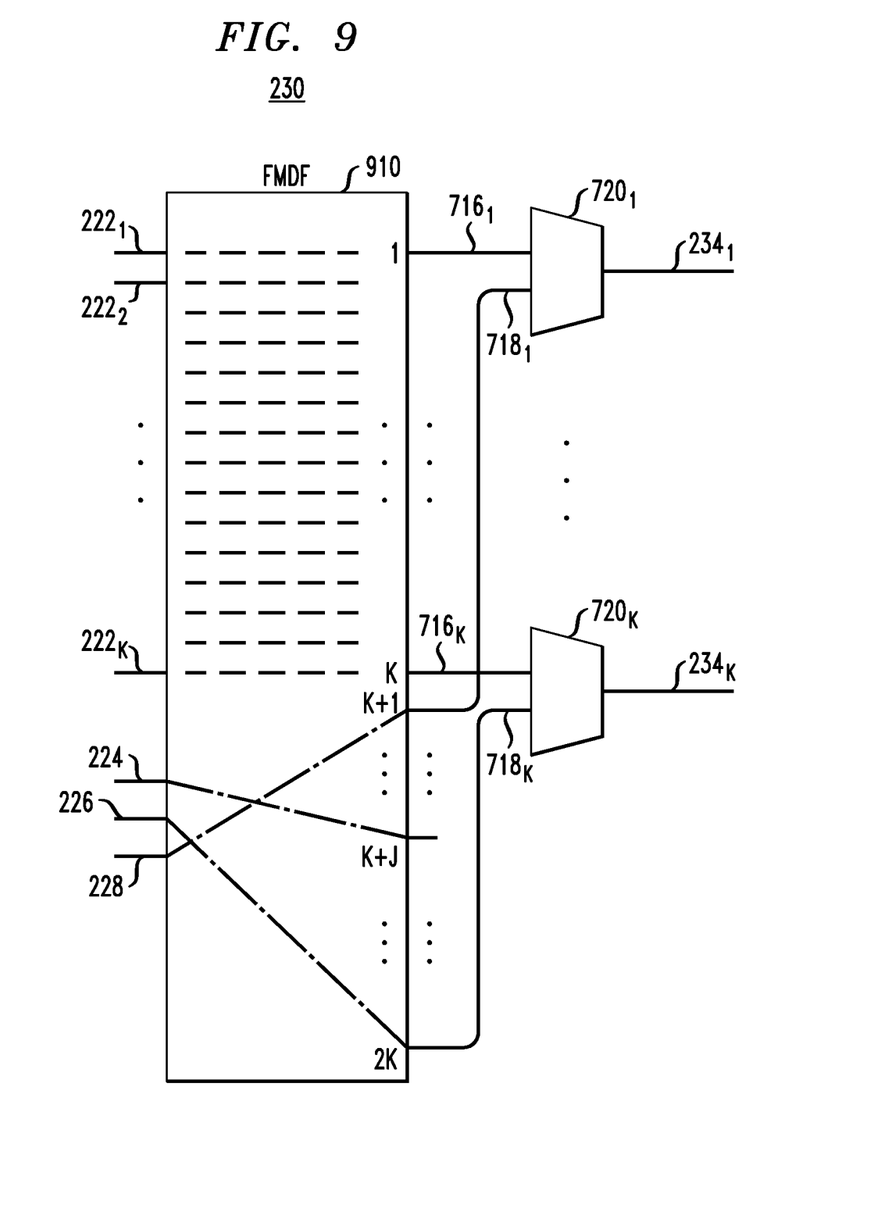
FIG. 9 shows a block diagram of an optical cross-connect that can be used in the PON system of FIG. 2 according to another embodiment.

FIG. 9 shows a block diagram of OXC 230 (FIG. 2) according to another embodiment. In the shown embodiment, OXC 230 comprises an automated fiber main distribution frame (FMDF) 910 and K wavelength multiplexers $720_1$-$720_K$ (also see FIG. 7). An FMDF can alternatively be referred to as a lightguide cross-connect (LGX).

A conventional FMDF (or LGX) is a manual cross-connect switch present in many telecom and datacom COs, from which optical fibers connect to the outside plant. These patch-panel switches allow plant workers in an office to provision services by connecting inside plant fibers associated with a piece of network gear in the office (such as an OLT port) to outside plant fibers terminated on the outward facing ports of the FMDF. This "switching" task is accomplished by manually connecting a short length of fiber cable from the inside-plant port to the outside-plant port of the FMDF.

The long-term roadmaps for many network operators include automation of these patch-panel switches by replacing them with suitable automated optical cross-connects (OXC). The embodiment shown in FIG. 9 uses such an automated FMDF (i.e., FMDF 910) in OXC 230.

For illustration purposes, FMDF 910 is shown in FIG. 9 as being a (K+3)×2K automated cross-connect. In an alternative embodiment, FMDF 910 can be a (K+1)×2K cross-connect or a (K+2)×2K cross-connect. Such an alternative embodiment can be constructed, e.g., by removing or disabling either optical port 228 or both optical ports 226 and 228 of the shown FMDF 910.

In yet another alternative embodiment, the size of FMDF 910 can be increased by adding more ports at the uplink side thereof, thereby converting FMDF 910 into a (K+M)×2K OXC, where M is a positive integer greater than three. Such an alternative embodiment can be used, e.g., for connecting an embodiment of OMM 210 having M lasers 520, e.g., lasers $520_1$-$520_M$ (also see FIG. 5). Some of these lasers $520_1$-$520_M$ may be configured to output nominally identical wavelengths, e.g., $\lambda_3$ and/or $\lambda_4$. In such cases, more than one optical port 234 can be connected to transmit, for example, the wavelength $\lambda_3$. In this manner, the number of ISMs $240_k$ of FIG. 6 that can be connected for charging at the same time may advantageously be increased, e.g., up to the total number of M.

As shown in FIG. 9, FMDF 910 has: (i) uplink ports $222_1$-$222_k$, 224, 226, and 228; and (ii) downlink ports 1, 2, ..., 2K. Each of downlink ports 1, 2, ..., K is externally connected, as indicated in FIG. 9, to a respective one of optical ports $716_1$-$716_K$ of wavelength multiplexers $720_1$-$720_K$. Each of downlink ports K+1, K+2, ..., 2K is externally connected, as indicated in FIG. 9, to a respective one of optical ports $718_1$-$718_K$ of wavelength multiplexers $720_1$-$720_K$.

In operation, FMDF 910 is configured to provide the following internal connections between the uplink and downlink optical ports thereof.

Each of uplink ports $222_1$-$222_K$ is internally connected to a single respective one of downlink ports 1, ..., K. Any one-to-one mapping between said uplink and downlink ports can be implemented in various configurations of FMDF 910, as long as the selected port mapping is compatible with the intended optical topology of system 200. The corresponding configuration of this part of FMDF 910 typically remains fixed (static) during data transmission between OLTs $110_1$-$110_K$ and various ONUs 160 of system 200.

Each of uplink ports 224, 226, and 228 can be connected to any one of downlink ports K+1, K+2, ..., 2K, such that any two of the ports 224, 226, and 228 are not connected to the same one of the ports K+1, K+2, ..., 2K at the same time. These connections are typically dynamic and can be changed during data transmission between OLTs $110_1$-$110_K$ and various ONUs 160 of system 200. As an example, FIG. 9 shows one possible configuration of this part of FMDF 910. In this example, port 224 is connected to port K+J; port 226 is connected to port 2K; and port 228 is connected to port K+1. Herein, the integer J is constrained to the range 1<J<K. A person of ordinary skill in the art will understand that the shown connections of ports 224, 226, and 228 can be changed in a desired manner to support the above-explained shared access of ISMs $240_1$-$240_K$ to OMM 210 in system 200 (FIG. 2).

In some embodiments, FMDF 910 can be implemented using: (i) a conventional K×K OXC switch, for uplink ports $222_1$-$222_K$ and downlink ports 1, ..., K; and (ii) a 3×K WSS, for uplink ports 224, 226, and 228 and downlink ports K+1, ..., 2K. Then, in some configurations, the WSS can be configured to combine two or more of the input wavelengths $\lambda_1$, $\lambda_3$ and $\lambda_4$ and apply the resulting combined light beam to a single downlink port thereof, thereby directing said combined light beam to a single PON via the corresponding one of the multiplexers 720. This concept can also be applied to the above-mentioned alternative embodiments in which FMDF 910 is implemented as a (K+M)×2K OXC.

According to an example embodiment disclosed above, e.g., in the summary section and/or in reference to any one or any combination of some or all of FIGS. 1-9, provided is an apparatus comprising: a plurality of first optical data transceivers (e.g., $110_1$-$110_K$, FIG. 2), each of the first optical data transceivers being connected to transmit and receive data-modulated light; an optical monitor (e.g., 210, FIG. 2); and an optical cross-connect (e.g., 230, FIG. 2) configured to connect each of the first optical data transceivers to a corresponding optical fiber (e.g., 238, FIG. 2); and wherein the optical monitor is optically connected to the optical cross-connect, and the optical cross-connect is switchable to optically connect the optical monitor to selected individual ones of the optical fibers such that the optical monitor can transmit light to and receive light from the selected individual ones of the optical fibers.

In some embodiments of the above apparatus, the optical monitor is configured to: transmit, through the optical cross-connect, data-modulated light having a first wavelength (e.g., $\lambda_1$, FIG. 3); and receive, through the optical cross-connect, data-modulated light having a second wavelength (e.g., $\lambda_2$, FIG. 3) that is different from the first wavelength.

In some embodiments of any of the above apparatus, the first optical data transceivers are configured to transmit and receive the data-modulated light using a plurality of wavelength channels; and wherein the first and second wavelengths are out-of-band with respect to the wavelength channels associated with the first optical data transceivers (e.g., $110_1$-$110_K$, FIG. 2).

In some embodiments of any of the above apparatus, the optical monitor is further configured to transmit, through the optical cross-connect, continuous-wave light having a third wavelength (e.g., $\lambda_3$, FIG. 3) different from the first and second wavelengths.

In some embodiments of any of the above apparatus, the apparatus further comprises a plurality of passive optical networks (e.g., $110_k/240_k/260_k$, FIG. 2), each one of the passive optical networks including a respective intelligent optical splitter configured to monitor at least some of the data-modulated light in said one of the passive optical networks directed to a corresponding one of the optical fibers (e.g., $240_1$-$240_K$, FIG. 2).

In some embodiments of any of the above apparatus, the respective intelligent optical splitter is configured to optically communicate with the optical monitor.

In some embodiments of any of the above apparatus, the respective intelligent optical splitter is configured to be powered using the light transmitted by the optical monitor.

In some embodiments of any of the above apparatus, the apparatus is configured to use wavelengths of light to communicate data over said one of the passive optical networks; and wherein the optical monitor is configured to power the respective intelligent optical splitter using one or more additional wavelengths that are different from said wavelengths of light.

In some embodiments of any of the above apparatus, the optical monitor is configured to communicate with the respective intelligent optical splitters of two or more of the passive optical networks.

In some embodiments of any of the above apparatus, each of the plurality of passive optical networks further includes a respective plurality (e.g., $260_k$, FIG. 2) of optical network units (e.g., $160_{k,n}$, FIG. 2) connected to communicate with a respective one of the first optical transceivers by way of the respective intelligent optical splitter.

In some embodiments of any of the above apparatus, the respective intelligent optical splitter comprises a respective second data transceiver (e.g., 460/470, FIG. 4) configured to communicate with the optical monitor.

In some embodiments of any of the above apparatus, the optical cross-connect comprises: a plurality of first optical ports (e.g., $234_1$-$234_K$, FIGS. 2, 7, 9), each of the first optical ports being externally connected to the corresponding optical fiber (e.g., 238, FIG. 2); and a second optical port (e.g., 224, FIGS. 7, 8A, 8B, 9) and a plurality of third optical ports (e.g., 1, ..., K, FIG. 7; K+1, ..., 2K, FIG. 9); wherein the optical monitor is optically connected to transmit and receive modulated optical signals through the second optical port, the optical cross-connect being switchable to selectively connect the second optical port to any one of the third optical ports; wherein each of the third optical ports is connected to a respective one of the first optical ports by way of a respective wavelength multiplexer (e.g., one of $720_1$-$720_K$, FIGS. 7, 9); and wherein each of the respective wavelength multiplexers is further connected between a respective one of the first optical data transceivers and the respective first optical port to transmit the data-modulated light therebetween.

In some embodiments of any of the above apparatus, the optical monitor is configured to transmit and receive light having wavelengths of a continuous spectral band; and wherein the data-modulated light transmitted and received by each of the first optical data transceivers has wavelengths outside said spectral band.

In some embodiments of any of the above apparatus, each of the respective wavelength multiplexers includes the respective first optical port (e.g., $234_k$, FIGS. 7, 9), a respective fourth optical port (e.g., $716_k$, FIGS. 7, 9), and a respective fifth optical port (e.g., $718_k$, FIGS. 7, 9) and is configured to: route the wavelengths of said spectral band between the respective first optical port and the respective fifth optical port; and route the wavelengths outside said spectral band between the respective first optical port and the respective fourth optical port.

In some embodiments of any of the above apparatus, the optical cross-connect comprises a wavelength-selective switch.

According to another example embodiment disclosed above, e.g., in the summary section and/or in reference to any one or any combination of some or all of FIGS. 1-9, provided is an apparatus comprising: a plurality of first optical data transceivers (e.g., $110_1$-$110_K$, FIG. 2), each of the first optical data transceivers being connected to transmit and receive modulated light through a respective first optical port (e.g., one of $234_1$-$234_K$, FIGS. 2, 7, 9), each of the first optical ports being externally connected to a different respective optical fiber (e.g., 238, FIG. 2); a second optical data transceiver (e.g., 210, FIGS. 2, 3, 5); and an optical switch (e.g., 710, FIGS. 7, 8A, 8B; 910, FIG. 9) having a second optical port (e.g., 224, FIGS. 7, 8A, 8B, 9) and a plurality of third optical ports (e.g., 1, ..., K, FIG. 7; K+1, ..., 2K, FIG. 9), the second optical data transceiver being connected to transmit and receive modulated light through the second optical port, the optical switch being switchable to selectively connect the second optical port to any one of the third optical ports; wherein each of the third optical ports is connected to a respective one of the first optical ports by way of a respective wavelength multiplexer (e.g., one of $720_1$-$720_K$, FIGS. 7, 9); and wherein each of the respective wavelength multiplexers is further connected between a respective one of the first optical data transceivers and the respective first optical port to transmit modulated light therebetween.

In some embodiments of the above apparatus, the second optical data transceiver is configured to: transmit modulated light having a first carrier wavelength (e.g., $\lambda_1$, FIG. 3); and receive modulated light having a second carrier wavelength (e.g., $\lambda_2$, FIG. 3) that is different from the first carrier wavelength.

In some embodiments of any of the above apparatus, the apparatus further comprises a plurality of passive optical networks (e.g., $110_k/240_k/260_k$, FIG. 2), each including a respective one of a plurality of intelligent splitter monitors (e.g., $240_1$-$240_K$, FIG. 2), each of the intelligent splitter monitors being fiber-connected to a respective one of the first optical ports; and wherein each of the intelligent splitter monitors includes a respective third data transceiver (e.g., 460/470, FIG. 4) configured to: transmit modulated light having the second carrier wavelength (e.g., $\lambda_2$, FIG. 4); and receive modulated light having the first carrier wavelength (e.g., $\lambda_1$, FIG. 4).

In some embodiments of any of the above apparatus, the apparatus further comprises a fiber distribution frame (e.g., 910, FIG. 9) that includes the optical switch.

In some embodiments of any of the above apparatus, the apparatus further comprises a first laser (e.g., $520_1$, FIG. 5); and wherein the optical switch has an additional optical port (e.g., 226, FIGS. 8A, 8B, 9), the first laser being connected to transmit light through the additional optical port, the optical switch being switchable to connect the additional optical port to any one of the third optical ports.

In some embodiments of any of the above apparatus, the second optical transceiver is configured to: transmit modulated light having a first carrier wavelength (e.g., $\lambda_1$, FIG. 5); and receive modulated light having a second carrier wavelength (e.g., $\lambda_2$, FIG. 5); wherein the first laser is configured to transmit unmodulated light having a third carrier wavelength (e.g., $\lambda_3$, FIG. 5); and wherein the first, second, and third carrier wavelengths are all different from one another.

In some embodiments of any of the above apparatus, the apparatus further comprises a second laser (e.g., $520_2$, FIG. 5); and wherein the optical switch has another additional optical port (e.g., 228, FIGS. 8B, 9), the second laser being connected to transmit light through said another additional optical port, the optical switch being switchable to connect said another additional optical port to any one of the third optical ports.

In some embodiments of any of the above apparatus, the second optical transceiver is configured to: transmit modulated light having a first carrier wavelength (e.g., $\lambda_1$, FIG. 5); and receive modulated light having a second carrier wavelength (e.g., $\lambda_2$, FIG. 5); wherein the first laser is configured to transmit unmodulated light having a third carrier wavelength (e.g., $\lambda_3$, FIG. 5); wherein the second laser is configured to transmit unmodulated light having a fourth carrier wavelength (e.g., $\lambda_4$, FIG. 5); and wherein the first, second, third, and fourth carrier wavelengths are all different from one another.

In some embodiments of any of the above apparatus, the second optical transceiver is configured to communicate with a plurality of intelligent splitter monitors (e.g., $240_1$-$240_K$, FIG. 2), each of the intelligent splitter monitors being fiber-connected to a respective one of the first optical ports.

In some embodiments of any of the above apparatus, the apparatus further comprises a plurality of passive optical networks (e.g., $110_k/240_k/260_k$, FIG. 2); and wherein each of the plurality of passive optical networks includes a respective one of the plurality of intelligent splitter monitors (e.g., $240_k$, FIG. 2) and a respective one of the first optical data transceivers (e.g., $110_k$, FIG. 2).

In some embodiments of any of the above apparatus, each of the plurality of passive optical networks further includes a respective plurality (e.g., $260_k$, FIG. 2) of optical network units (e.g., $160_{k,n}$, FIG. 2) connected to communicate with the respective one of the first optical transceivers by way of the respective one of the plurality of intelligent splitter monitors.

In some embodiments of any of the above apparatus, each of the intelligent splitter monitors includes a respective third data transceiver (e.g., 460/470, FIG. 4) configured to communicate with the second optical transceiver.

In some embodiments of any of the above apparatus, the optical switch comprises a wavelength-selective switch.

In some embodiments of any of the above apparatus, the second optical transceiver is configured to transmit and receive modulated light having wavelengths of a continuous spectral band; and wherein each of the first optical data transceivers is configured to transmit and receive modulated light having wavelengths outside said spectral band.

In some embodiments of any of the above apparatus, each of the respective wavelength multiplexers includes the respective first optical port (e.g., $234_k$, FIGS. 7, 9), a respective fourth optical port (e.g., $716_k$, FIGS. 7, 9), and a respective fifth optical port (e.g., $718_k$, FIGS. 7, 9) and is configured to: route the wavelengths of said spectral band between the respective first optical port and the respective fifth optical port; and route the wavelengths outside said spectral band between the respective first optical port and the respective fourth optical port.

According to yet another example embodiment disclosed above, e.g., in the summary section and/or in reference to any one or any combination of some or all of FIGS. 1-9, provided is an apparatus comprising: a passive optical router (e.g., 430, FIG. 6) connectable to route light between a first optical fiber (e.g., 238, FIG. 6) and a plurality of second optical fibers (e.g., 244, FIG. 6); an optical receiver (e.g., 460, FIG. 6) configured to receive a first modulated optical signal (e.g., 332, FIG. 6) applied to the apparatus by the first optical fiber, said first modulated optical signal having a first wavelength (e.g., $\lambda_1$, FIG. 6); a photovoltaic cell (e.g., 410, FIG. 6) configured to charge a capacitor (e.g., 414, FIG. 6) in response to light (e.g., 522, FIG. 6) applied to the apparatus by the first optical fiber, said applied light having a second wavelength (e.g., $\lambda_3$, FIG. 6) that is different from the first wavelength; and an electronic controller (e.g., 450, FIG. 6) configured to control electrical-power distribution from the capacitor to power the optical receiver and the electronic controller.

In some embodiments of the above apparatus, the apparatus further comprises an array of photodetectors (e.g., 440, FIG. 6), each individual one of the photodetectors being configured to detect data-modulated light applied to the passive optical router by a corresponding individual one of the second optical fibers; and wherein the electronic controller is further configured to control the electrical-power distribution from the capacitor to power the array.

In some embodiments of any of the above apparatus, the apparatus further comprises an optical transmitter (e.g., 470, FIG. 6) configured to generate a second modulated optical signal (e.g., 344, FIG. 6) in response to the data-modulated light detected by the individual ones of the photodetectors; and wherein the electronic controller is further configured to control the electrical-power distribution from the capacitor to power the optical transmitter.

In some embodiments of any of the above apparatus, the second modulated optical signal has a third wavelength (e.g., $\lambda_2$, FIG. 6) that is different from the first and second wavelengths.

In some embodiments of any of the above apparatus, the passive optical router is configured to route data-modulated light between an optical line terminal (e.g., 110, FIG. 2) and a plurality of optical network units (e.g., 160, FIG. 2) of a passive optical network.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
a plurality of first optical data transceivers, each of the first optical data transceivers being connected to transmit and receive data-modulated light through a corresponding optical fiber;
an optical monitor comprising a laser configured to generate continuous-wave light and a second optical data transceiver; and
an optical cross-connect connecting each one of the first optical data transceivers to a corresponding one of first optical ports thereof, the corresponding optical fiber being external to the optical cross-connect and connected to said corresponding one of the first optical ports;

wherein the second optical data transceiver is optically connected to a second optical port of the optical cross-connect and the optical cross-connect is switchable to optically connect the second optical port to selected individual ones of the first optical ports; and wherein the laser is optically connected to a third optical port of the optical cross-connect and the optical cross-connect is switchable to selectively optically connect the third optical port to selected single ones of the first optical ports.

2. The apparatus of claim 1, wherein data-modulated light transmitted through the optical cross-connect by the second optical data transceiver has a first wavelength; and wherein the second optical data transceiver is further configured to receive, through the optical cross-connect, data-modulated light having a second wavelength that is different from the first wavelength.

3. The apparatus of claim 2, wherein the first optical data transceivers are configured to transmit and receive the data-modulated light using a plurality of wavelength channels; and wherein the first and second wavelengths are out-of-band with respect to the wavelength channels.

4. The apparatus of claim 2, wherein the continuous-wave light has a third wavelength different from the first and second wavelengths.

5. The apparatus of claim 1, further comprising a plurality of passive optical networks, each one of the passive optical networks including a respective intelligent optical splitter configured to monitor at least some of the data-modulated light in said one of the passive optical networks.

6. The apparatus of claim 5, wherein the respective intelligent optical splitter is configured to optically communicate with the second optical data transceiver.

7. The apparatus of claim 5, wherein the respective intelligent optical splitter is configured to be powered using some of the continuous-wave light.

8. The apparatus of claim 5, wherein the second optical data transceiver is configured to communicate with the respective intelligent optical splitters of two or more of the passive optical networks.

9. The apparatus of claim 5, wherein each of the plurality of passive optical networks further includes a respective plurality of optical network units connected to communicate with a respective one of the first optical transceivers by way of the respective intelligent optical splitter.

10. The apparatus of claim 1, wherein the optical cross-connect comprises a wavelength-selective switch, the second and third optical ports being optical ports of the wavelength-selective switch.

11. The apparatus of claim 1, wherein the optical cross-connect is switchable such that the second optical port and the third optical port are not optically connected to a same one of the first optical ports at a same time.

12. The apparatus of claim 1, wherein the optical cross-connect is switchable such that the second optical port and one of the first optical data transceivers are optically connected to a same one of the first optical ports.

13. The apparatus of claim 1, wherein the optical cross-connect is switchable such that the third optical port and one of the first optical data transceivers are optically connected to a same one of the first optical ports.

14. An apparatus comprising:

a plurality of first optical data transceivers, each of the first optical data transceivers being connected to transmit and receive data-modulated light;

an optical monitor; and an optical cross-connect configured to connect each of the first optical data transceivers to a corresponding optical fiber;

wherein the optical monitor is optically connected to the optical cross-connect, and the optical cross-connect is switchable to optically connect the optical monitor to selected individual ones of the optical fibers such that the optical monitor can transmit light to and receive light from the selected individual ones of the optical fibers;

wherein the optical cross-connect comprises:

a plurality of first optical ports, each of the first optical ports being externally connected to the corresponding optical fiber; and a second optical port and a plurality of third optical ports;

wherein the optical monitor is optically connected to transmit and receive modulated optical signals through the second optical port, the optical cross-connect being switchable to selectively connect the second optical port to any one of the third optical ports;

wherein each of the third optical ports is connected to a respective one of the first optical ports by way of a respective wavelength multiplexer; and wherein each of the respective wavelength multiplexers is further connected between a respective one of the first optical data transceivers and the respective first optical port to transmit the data-modulated light therebetween.

15. The apparatus of claim 14, wherein the optical monitor is configured to transmit and receive light having wavelengths of a continuous spectral band; and wherein the data-modulated light transmitted and received by each of the first optical data transceivers has wavelengths outside said spectral band.

16. The apparatus of claim 15, wherein each of the respective wavelength multiplexers includes the respective first optical port, a respective fourth optical port, and a respective fifth optical port and is configured to:

route the wavelengths of said spectral band between the respective first optical port and the respective fifth optical port; and route the wavelengths outside said spectral band between the respective first optical port and the respective fourth optical port.

* * * * *